United States Patent
Sugita et al.

[11] Patent Number: 6,040,091
[45] Date of Patent: Mar. 21, 2000

[54] LITHIUM ION SECONDARY CELL SOLVENT

[75] Inventors: Hiroaki Sugita, Susono; Hisashi Yamamoto, Nagoya, both of Japan

[73] Assignee: Toyota Jidosha Kabushiki Kaisha, Toyota, Japan

[21] Appl. No.: 09/106,268

[22] Filed: Jun. 29, 1998

[30] Foreign Application Priority Data

Jul. 10, 1997 [JP] Japan ................................. 9-185373

[51] Int. Cl.[7] ................................................. H01M 6/04
[52] U.S. Cl. .......................... 429/324; 429/345; 429/188; 429/305
[58] Field of Search ............................. 429/191, 192, 429/199, 305, 325, 345

[56] References Cited

U.S. PATENT DOCUMENTS 3,341,624  9/1967  Sherr et al. .
5,714,277  2/1998  Kawakami ........................... 429/62
5,847,188  12/1998  Yokoyama ........................... 558/277

FOREIGN PATENT DOCUMENTS 5-326017  12/1993  Japan .

*Primary Examiner*—Maria Nuzzolillo
*Assistant Examiner*—Mark Ruthkosky
*Attorney, Agent, or Firm*—Oliff & Berridge, PLC

[57] ABSTRACT

A thiophosphate flame retardant represented by $(R_1S)_3P=O$, wherein $R_1$ is aryl, alkaryl, or aralkyl, is added to a non-aqueous solvent to the extent of approximately 1/10–1/100 of a carbonate type solvent which is the main component of an electrolyte, to provide a lithium ion secondary cell solvent offering improved fire-retarding properties without much change of electrolyte composition. In this way, the boiling point can be raised and flame retarding properties can be conferred with almost no increase in the viscosity of the electrolyte.

4 Claims, 2 Drawing Sheets

LITHIUM ION SECONDARY CELL SOLVENT

BACKGROUND OF THE INVENTION

1. Field of the Invention

This invention relates to the improvement of a solvent used in non-aqueous solvent system lithium ion secondary cells.

2. Description of the Related Art

Attempts have been made to improve the temperature properties of the electrolyte in non-aqueous solvent system lithium ion secondary cells, and to raise its boiling point to render it non-flammable. For example, in Japanese Patent Laid-Open Publication No. Hei 5-326017, a high boiling non-aqueous solvent such as sulfolane is added to an electrolyte to raise the boiling point so as to make the electrolyte non-flammable.

However in that art, the high boiling non-aqueous solvent also has a high viscosity. When this is added to the electrolyte, the electrolyte composition is largely modified, its viscosity increases, and tends to lead to a decrease of cycle properties due to a decrease of electrical conductance or a decrease of ion transport rate.

SUMMARY OF THE INVENTION

It is therefore an object of this invention, which was conceived in view of the above problem, to provide a lithium ion secondary cell solvent having improved fire-retarding properties without a major modification of electrolyte composition.

To achieve this object, this invention may be a lithium ion secondary cell solvent wherein a thiophosphate type flame retardant represented by $(R_1S)_3P=O$, wherein $R_1$ is aryl, alkaryl or aralkyl, is added to a non-aqueous solvent.

In this lithium ion secondary cell solvent, the thiosulfate flame retardant is added to the non-aqueous solvent in a ratio of 1/10–1/100.

The lithium ion secondary cell solvent is further characterized in that the molecule of the flame retardant added to the non-aqueous solvent comprises a part of identical molecular structure to the non-aqueous solvent.

In the lithium ion secondary cell solvent, the thiophosphate flame retardant maybe represented by $(R_2S)_3P=O$ where $R_2$ is carbonate when the aforesaid non-aqueous solvent is a carbonate type solvent, ether when it is an ether type solvent, and carbonic acid ester when it is a carbonic acid ester type solvent.

DESCRIPTION OF THE PREFERRED EMBODIMENTS

Figure 1:
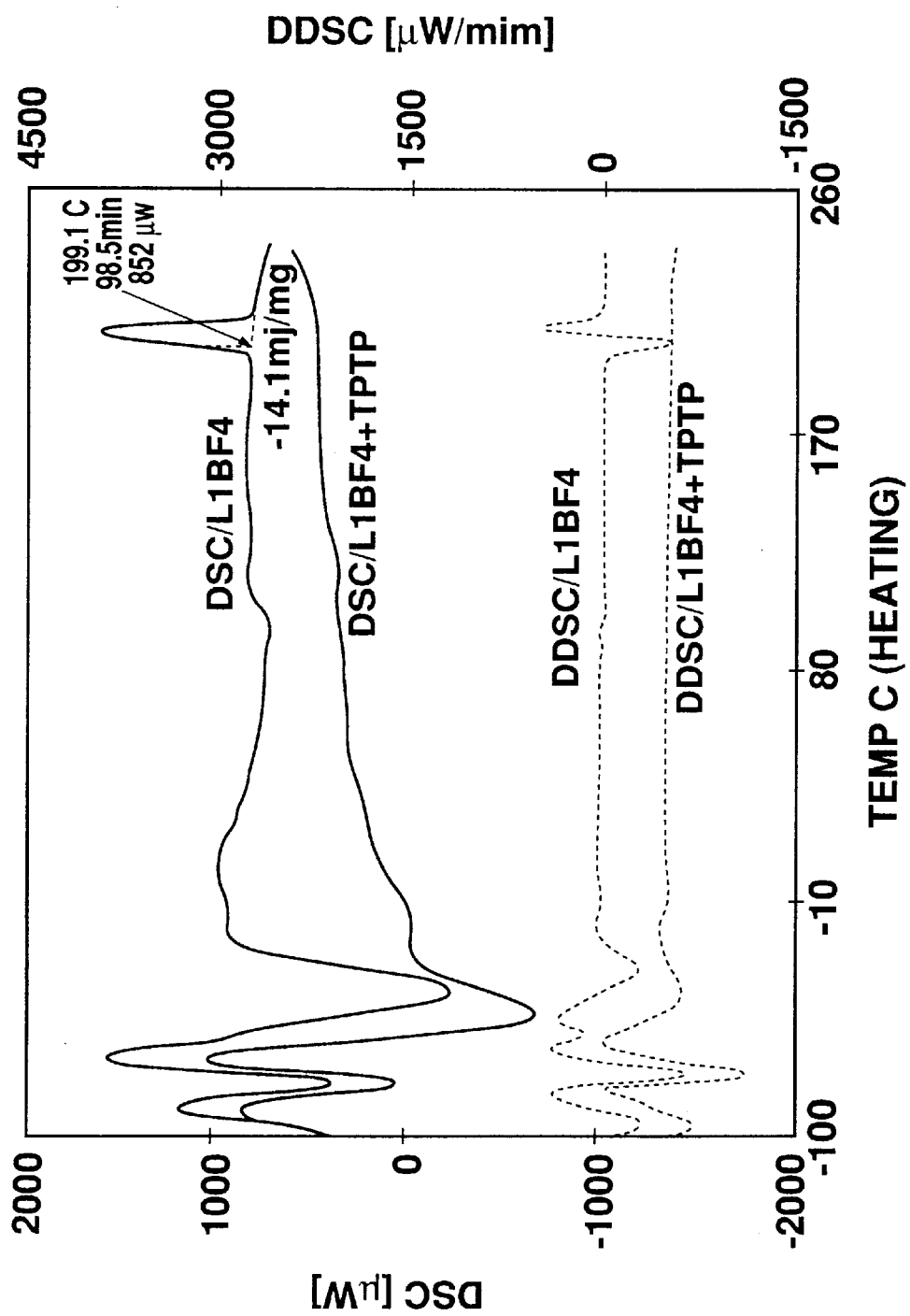
FIG. 1 is a diagram showing boiling point measurements for the lithium ion secondary cell solvent.

Embodiments of this invention will now be described in detail.

EMBODIMENT 1

The inventor studied the problem of how to raise the boiling point of non-aqueous solvent type lithium ion secondary cell electrolytes without increasing their viscosity, and discovered a substance suitable as an additive for these electrolytes.

A thiophosphate type flame retardant having the following molecular structure is added to a carbonate solvent used in non-aqueous solvent lithium ion secondary cells, e.g. ethylene carbonate, diethyl carbonate or mixtures of same. A satisfactory effect is obtained when the addition amount is of the order of 1/10–1/100 of the carbonate solvent which is the main component of the electrolyte. $R_1$ in the molecule may be aryl ($C_6$–$C_{10}$), alkaryl ($C_7$–$C_{11}$) or aralkyl ($C_7$–$C_{11}$), as shown below.

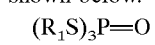

where $R_1$ may be:
aryl ($C_6$–$C_{10}$), alkaryl ($C_7$–$C_{11}$) or aralkyl ($C_7$–$C_{11}$)

Of the above molecule structures, aryl may for example be S,S,S-triphenyltrithiophosphate.

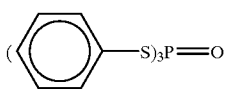

S,S,S-triphenyltrithiophosphate

As only a small amount of the aforesaid thiophosphate type flame retardant need be added to the electrolyte, there is almost no effect on the viscosity of the electrolyte. Fire-retarding properties may therefore be improved without greatly changing the electrolyte composition and while maintaining the viscosity at a low level.

EMBODIMENT 2

The electric potential of the electrolyte used in a lithium ion secondary cell is normally in the region of 4 V, so high anti-oxidative decomposition properties are required. The same properties are required of substances which exist free in the electrolyte, e.g. the flame retardant. It is considered useful if the substance itself has a high decomposition potential, and disperses stably in the electrolyte. The structure of the R1 portion of the molecule shown in Embodiment 1 was therefore modified to improve its compatibility with the non-aqueous solvent. Specifically, carbonate was introduced into the molecule when the non-aqueous solvent was a carbonate type solvent, ether was introduced when it was an ether type solvent, and carbonic acid ester was introduced when it was a carbonic acid ester type solvent.

An example of this molecular structure is shown below.

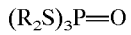

where $R_2$ is:
  a straight chain carbonate
    {e.g. diethyl carbonate (DEC) or dimethyl carbonate (DMC)}
  a cyclic carbonate
    {e.g. propylene carbonate (PC) or ethylene carbonate (EC)}
  a straight chain ether
    {e.g. dimethoxyethane (DME)}
  a cyclic ether
    {e.g. tetrahydrofuran (THF) or 4-methyl-1,3-dioxolane (4MeDOL)}
  a straight chain carbonic acid ester
    {e.g. methyl formate, methyl acetate or methyl propionate}
  a cyclic carbonic acid ester
    {e.g. γ-butyrolactone or γ-valerolactone}

Hence, a fragment having the same molecular structure as that of the non-aqueous solvent, such as carbonate, ether, or carbonic acid ester, is introduced into the molecule corresponding to the non-aqueous solvent so as to improve compatibility.

In the molecular structures below, examples are shown where $R_2$ is diethyl carbonate or propylene carbonate.

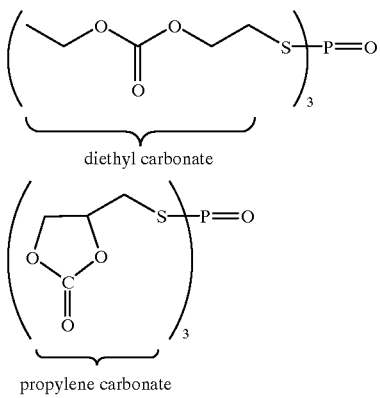

Hence, if the same molecular structure is introduced as that of the non-aqueous solvent which is the main component of the electrolyte system, a more effective compatibility can be achieved. As a result of this improved compatibility, the stability of the flame retardant in the electrolyte is improved and cycle properties are improved as described hereabove.

Some specific examples of this invention will now be given.

EXAMPLE 1

An electrolyte was prepared by blending ethylene carbonate and diethyl carbonate in a volume ratio of 20:80, and a lithium salt ($LiBF_4$) was added to give a 1M concentration (mol/l) S,S,S-triphenylthiophosphate was added to this electrolyte and dissolved to give a concentration of 0.1M (mol/l) (5.56 g/200 cc electrolyte).

Approximately 8 mg of this electrolyte was filled in an Al sealing tube, and the boiling point of the solution examined using DSC (SEIKO Instruments). The results are shown in FIG. 1. As a comparison, the same examination was performed for a system without addition of S,S,S triphenylthiophosphate.

As shown in FIG. 1, a heat adsorption peak at the boiling point was observed at 199° C. for the comparison example (DSC/$LiBF_4$). On the other hand for the system with added S,S,S-triphenylthiophosphate according to this invention (DSC/$LiBF_4$+TPTP), no heat absorption peak was observed in the vicinity of 250° C. Therefore, the boiling point is raised and fire-retarding properties are improved for the lithium ion secondary cell solvent according to this invention due to the addition of the aforesaid S,S,S-triphenylthiophosphate flame retardant.

EXAMPLE 2

Figure 2:
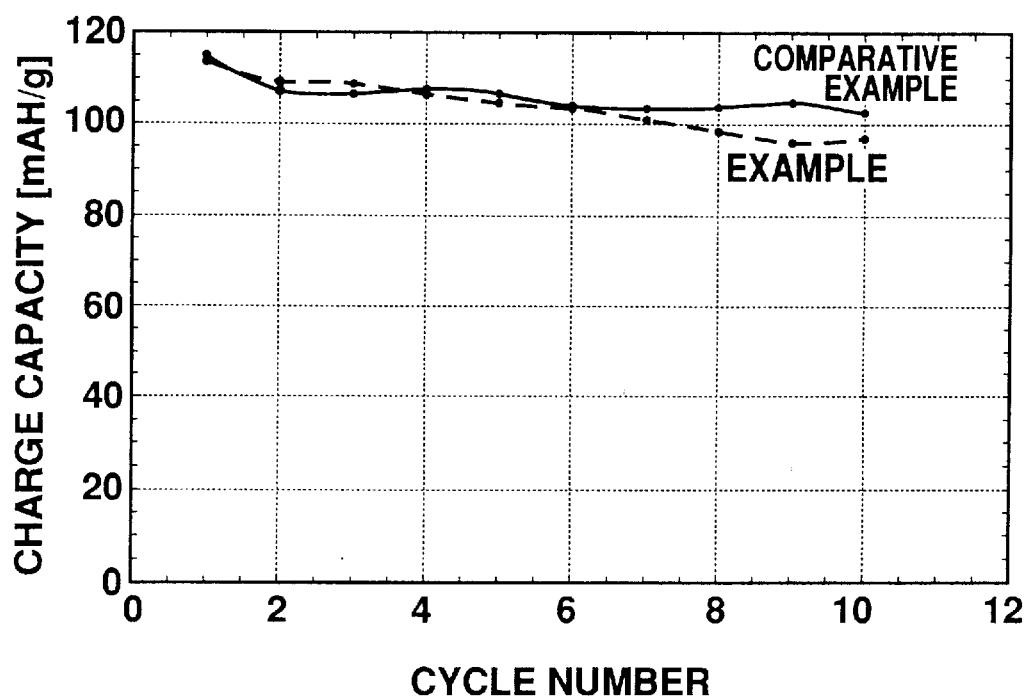
FIG. 2 is a diagram showing the cycle properties of a tripolar cell.

A fire-retarding electrolyte was prepared by adding 2.78 g of S,S,S triphenylthiophosphate to 100 cc of a commercial electrolyte (1M-$LiCO_4$ (EC/DEC=20/80), Mitsubishi Chemicals). Also, a unipolar cell was prepared by coating $LiCoO_2$ on nickel foil and pressing to form an anode, enclosing it between glass plates using lithium metal foil as the opposite electrode via a porous polyethylene separator. A tripolar cell was prepared by immersing this unipolar cell in a glass container filled with the aforesaid fire-retarding electrolyte and using lithium metal as a reference electrode, then pulling out terminals from the each cell and the electrode, and a cycle test was conducted at a low current of 10 mA. The results are shown in FIG. 2. As a comparison, the test results are also shown for a tripolar cell prepared without the addition of the aforesaid S,S,S-triphenylthiophosphate.

It can be seen from FIG. 2 that although some decrease of charge capacity is observed for the solvent of this invention relative to the comparison example, it is of a level which presents no problem in practice.

From the results of Examples 1, 2 described above, it is seen that the boiling point is raised and fire-retarding properties are improved without deterioration of cycle properties due to the addition of a small amount of a thiophosphate flame retardant such as S,S,S-triphenlythiophosphate.

Hence, according to this invention, fire-retarding properties can be conferred without much change of electrolyte composition due to the addition of a small amount of flame retardant. Cycle properties are moreover further improved by using a fire-retarding additive having a molecular structure which is compatible with carbonate type solvents.

What is claimed is:

1. A lithium ion secondary cell solvent characterized in that a thiophosphate type flame retardant represented by $(R_1S)_3P=O$, wherein R1 is aryl, alkaryl, or aralkyl, is added to a non-aqueous solvent.

2. A lithium ion secondary cell solvent as defined in claim 1, wherein said thiophosphate flame retardant is added to said non-aqueous solvent in a ratio of 1/10–1/100.

3. A lithium ion secondary cell solvent comprising a thiophosphate type flame retardant represented by the formula $(R_2S)_3P=O$ added to a non-aqueous solvent, wherein $R_2$ being (i) a carbonate when the non-aqueous solvent is a carbonate type solvent, (ii) an ether when the non-aqueous solvent is an ether type solvent, and (iii) a carbonic acid ester when the non-aqueous solvent is a carbonic acid ester type solvent.

4. A lithium ion secondary cell solvent comprising a thiophosphate type flame retardant represented by the formula $(RS)_3P=O$ added to a non-aqueous solvent, wherein R comprises a fragment having the same molecular structure of the non-aqueous solvent.

* * * * *